UNITED STATES PATENT OFFICE.

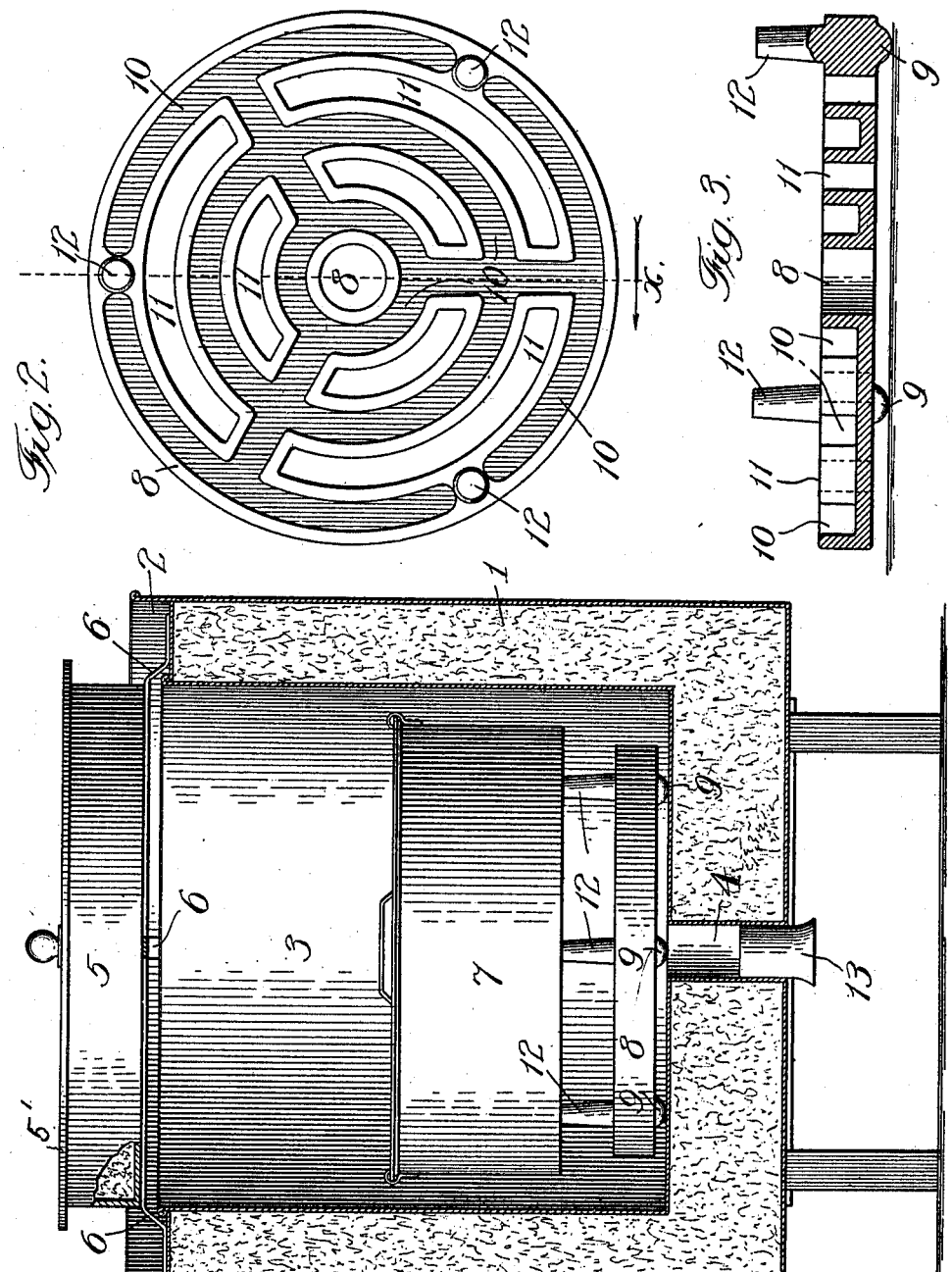

EARL P. SEDGWICK, OF HIGHLAND PARK, ILLINOIS.

COOKER.

993,113.  Specification of Letters Patent.  Patented May 23, 1911.

Application filed January 16, 1911. Serial No. 602,848.

*To all whom it may concern:*

Be it known that I, EARL P. SEDGWICK, a citizen of the United States of America, and a resident of Highland Park, in the county of Lake and State of Illinois, have invented certain new and useful Improvements in Cookers, of which the following is a specification.

This invention relates to that class of cookers in which the residual heat stored in the cooker is adapted to complete the cooking operation. And the present improvement has for its object to provide a simple and efficient structural arrangement and combination of parts whereby the initial heating of the cooker in a ready, economical and efficient manner is attained, with a storage of the requisite amount of heat in the walls and other parts of the cooker to complete the cooking operation, the change from the direct heating of the initial cooking operation to the indirect heating of the final cooking operation being effected in a simple and ready manner by the present construction of parts, all as will hereinafter more fully appear.

In the accompanying drawings: Figure 1, is a central sectional elevation of a cooker embodying the present invention. Fig. 2, is a plan view of the heater or burner detached. Fig. 3, is a section of the same, on line $x$—$x$, Fig. 2.

Similar numerals of reference indicate like parts in the different views.

Referring to the drawings, 1 represents the main casing of the cooker, the sides and bottom of which are rendered nonconductive of heat by a filling of loose insulating material, such as asbestos, inclosed within inner and outer sheet metal shells, as usual and as shown in Fig. 1. In my preferred construction the outer shell or side wall of the casing will extend a short distance above the body of the casing to form an annular collar 2, and provide an open top space for the reception of the cover, and for deflecting upwardly the products of combustion, as hereinafter more fully stated.

3 is the cooking chamber of the apparatus, open its full area at top and provided at bottom with a central reduced opening or passage 4 for the passage of a supply of air to the burner hereinafter described, to support combustion in the initial heating operation of the apparatus.

5 is the cover, preferably of the usual non-conducting type, and consisting of sheet metal inclosing a body of non-conducting material. Said cover is adapted to closely fit the open mouth of the cooking chamber 3, and its proper position is maintained therein by a marginal top flange 5, as shown.

6 is a supporting spider, the outer ends of which are adapted to rest upon the top of the cooker casing 1, while its central portion supports the cover 5 in a raised position above the mouth of the cooking chamber 3, as illustrated in Fig. 1. The raised position of the cover 5, just described, is the one used in the initial cooking or heating operation of the apparatus, and is adapted to permit of the free escape of the products of combustion from the burner hereinafter described, while the other position of the cover heretofore mentioned, to wit: fitting tightly the mouth of the cooking chamber 3, is the one used in the final cooking operation of the apparatus, and in which the burner is in an inactive condition.

7 is one of the covered cooking vessels used in the apparatus.

8 is the heater or burner employed in the apparatus, and which preferably consists of a flat cast metal body, the underside of which is provided with a series of supporting lugs or feet 9 for supporting said body a short distance above the bottom of the cooking chamber 3, while the upper side of said flat metal body is formed with an open top tortuous channel 10, between the ramifications of which are formed in turn a series of vertical passages 11 extending through the body of the burner 8 and adapted for the passage of air to promote combustion in the actual operation of the heater. With the described construction the tortuous channel 10 will contain a supply of alcohol or like combustible hydrocarbon.

12, are a series of upwardly extending prongs on the body of the burner for the purpose of supporting the cooking vessel 7 in a raised position above the burner 8.

In actual use, the apparatus will be arranged as shown in Fig. 1, and the burner 8 containing a charge of alcohol or other liquid fuel lighted. With the gradual combustion of the fuel, the cooking vessel 7, as well as the interior of the cooker, its cover 5, and the metal of the burner 8, are heated, and what is herein termed the initial heating of the cooker accomplished, with the combustion of the described charge of liquid fuel. The supporting spider 6, is then removed, and the cover 5 fitted to the mouth of the cooking chamber 3 to close the same, and at the same time the air inlet 4 at the bottom of said chamber is closed by a suitable stopper 13. As so arranged the parts are in condition to effect the final cooking operation by the heat stored up in the cooker parts above mentioned.

Having thus fully described my said invention what I claim as new and desire to secure by Letters Patent, is:—

1. A cooker, comprising a casing having an open top and an air inlet at the bottom, a cover for said open top, a removable spider adapted to support said cover a short distance above the open top of the casing, and a heater arranged within the chamber of said casing and adapted to support a cooking vessel within the chamber aforesaid, substantially as set forth.

2. A cooker, comprising a casing having an open top and an air inlet arranged centrally at the bottom, a cover for said open top, a removable spider adapted to support said cover a short distance above the open top of the casing, and a heater arranged within the chamber of said casing and comprising a flat body of metal having a tortuous channel formed in its upper side and a series of intermediate vertical passages between the ramifications of said channel, the heater being adapted to support a cooking vessel within the chamber aforesaid, substantially as set forth.

3. A cooker, comprising a casing having an open top and an air inlet arranged centrally at the bottom, a cover for said open top, a removable spider adapted to support said cover a short distance above the open top of the casing, and a heater arranged within the chamber of said casing and comprising a flat body provided with upwardly and downwardly extending feet and formed with a tortuous channel in its upper face and with a series of intermediate vertical passages between the ramifications of said channel, the upwardly extending feet of the flat body aforesaid being adapted to support a cooking vessel, substantially as set forth.

Signed at Highland Park, Ill., this 13th day of January, 1911.

EARL P. SEDGWICK.

Witnesses:
J. M. ENIS,
G. L. BREWSTER.

---

Copies of this patent may be obtained for five cents each, by addressing the "Commissioner of Patents, Washington, D. C."